United States Patent [19]

Pearce

[11] 4,411,137
[45] Oct. 25, 1983

[54] PRIMING DEVICE FOR BURNER MANIFOLDS OF GAS TURBINE ENGINE

[75] Inventor: Maurice N. Pearce, Mickleover, England

[73] Assignee: Rolls-Royce Limited, London, England

[21] Appl. No.: 306,524

[22] Filed: Sep. 28, 1981

[30] Foreign Application Priority Data

Oct. 30, 1980 [GB] United Kingdom ............... 8034940

[51] Int. Cl.³ .............................................. F02G 1/00
[52] U.S. Cl. ...................................... 60/739; 60/742
[58] Field of Search .............. 60/739, 742, 746, 413, 60/415, 39.21; 417/302, 199 A

[56] References Cited

U.S. PATENT DOCUMENTS 2,770,945 11/1956 Crim ................................. 60/739 X
3,283,502 11/1966 Lefebvre .............................. 60/739

FOREIGN PATENT DOCUMENTS 878340 9/1961 United Kingdom .

Primary Examiner—Edward K. Look
Attorney, Agent, or Firm—Cushman, Darby & Cushman

[57] ABSTRACT

A device for priming an empty or partially full burner manifold of a gas turbine engine with fuel before it is required to supply from the burner manifold to the associated burners comprises a fuel accumulator and a control valve.

A fuel pressure signal supplied to the control valve terminates the supply of relatively high pressure fuel to the fuel accumulator via the control valve. A metered quantity of fuel is supplied via the control valve to the burner manifold from the fuel accumulator by the motive force of a spring acting on a piston in the accumulator. The metered quantity of fuel is supplied via the control valve to the burner manifold, to fill the burner manifold and to prevent undesireable drops in the quantity of fuel being supplied to other manifolds when the regulated fuel is supplied to the burner manifold.

8 Claims, 5 Drawing Figures

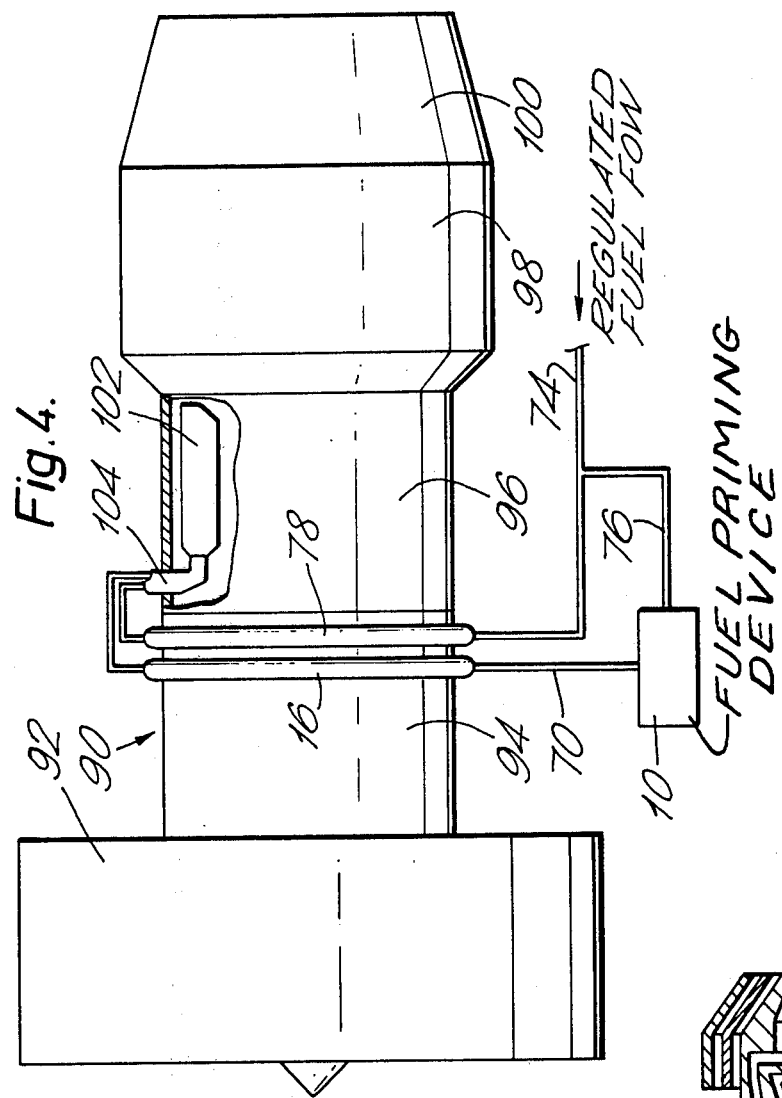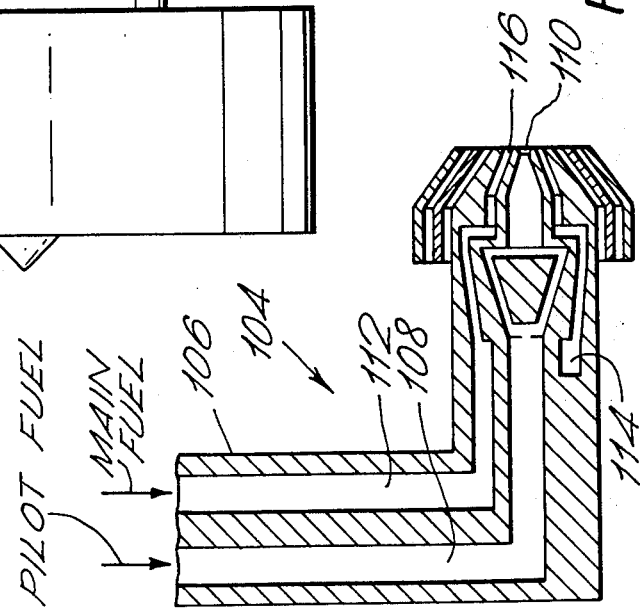

PRIMING DEVICE FOR BURNER MANIFOLDS OF GAS TURBINE ENGINE

This invention relates to a device for priming burner manifolds which supply fuel to fuel burners used in combustion chambers of gas turbine engines.

Staged fuel injection is an accepted method of controlling emissions from the combustion chambers of gas turbine engines operating at engine idle speeds.

This method requires the use of two types of fuel burners, pilot burners and main burners both fed with fuel from a regulated fuel supply. The pilot burners which are designed for operation at relatively low fuel flow rates, are used to give low emission levels at engine idle speeds. The main burners are designed for operation at relatively high fuel flow rates. When higher engine operating speeds are required the main burners are used in conjunction with the pilot burners.

The introduction of the main burners after a period of running on pilot burners alone, will cause an undesirable drop in the quantity of fuel supplied to the pilot burners while the burner manifold or manifolds of the main burners are filled with fuel from the regulated fuel supply.

It is an object of the present invention to provide priming means to provide a metered quantity of fuel to fill the burner manifold of the main burners before fuel is supplied from the regulated fuel supply to the burner manifold of the main burners, when the main burners are introduced after a period of running on the pilot burners alone.

It is a further object of the present invention to ensure that over priming of the burner manifold does not occur, as this could lead to fuel being injected into the combustion chamber from the main burners at high flow rates causing an engine surge.

According to the present invention there is provided a fuel priming device for gas turbine engine burner manifolds used in supplying fuel to to fuel burners in combustion chambers of gas turbine engines comprising a fuel accumulator, a control valve, a control valve operating means, a regulated fuel supply, a relatively high pressure fuel supply and at least one burner manifold, the fuel accumulator and the regulated fuel supply are arranged to supply fuel sequentially to the burner manifold through the control valve, and the relatively high pressure fuel supply is arranged to supply fuel to the fuel accumulator through the control valve, the control valve being moveable by the control valve operating means from a first position in which the fuel accumulator is connected to the relatively high pressure fuel supply to a second position in which the relatively high pressure fuel supply is disconnected from the fuel accumulator and the fuel accumulator is connected to the burner manifold to provide a metered quantity of fuel to the burner manifold against a pressure in the burner manifold and a third position in which the regulated fuel supply is connected to the burner manifold and the fuel accumulator is disconnected from the burner manifold.

The present invention also provides that the metered quantity of fuel being supplied from the fuel accumulator to the burner manifold against a pressure in the burner manifold is terminated when the pressure in the burner manifold reaches a predetermined level.

The present invention also provides that the fuel accumulator comprises a piston being enclosed in a cylinder and defining with the cylinder a first chamber and second chamber, the piston being moveable through said first chamber by means of a spring positioned in said second chamber to supply fuel from said first chamber to the burner manifold against a pressure in the burner manifold, the motive force of the spring being overcome by the pressure in the burner manifold and terminates the supply of the metered quantity of fuel when the pressure in the burner manifold reaches a predetermined level.

The fuel accumulator has an adjustable volume control extending into the first chamber to limit the movement of the piston, the adjustable volume control may be moved to control the metered quantity of fuel supplied to the burner manifold against a pressure in the burner manifold.

The fuel accumulator supplies fuel to the burner manifold through a variable restrictor to permit adjustment of the priming time.

The control valve operating means comprises a first and second pipe means to supply a pressure operating signal to the control valve, the second pipe means having a restrictor, the pressure operating signal being supplied via first and second pipe means to move the control valve from said first position to said second position when the supply of the pressure operating signal via first pipe means is disconnected and the pressure operating signal is supplied via second pipe means to move control valve from said second position to said third position.

The control valve operating means also comprises a third pipe means having a non-return valve, to release the pressure in the control valve to the first pipe means when the pressure operating signal ceases and returns control valve to said first position.

The burner manifold may be used to supply fuel to the main fuel burners in combustion chambers of gas turbines operating staged burning or sector burning.

The present invention will now be described with reference to the accompanying drawings in which FIGS. 1 to 3 show the fuel priming device according to the invention with the control valve of the device.

FIG. 4 shows a cut-away view of a gas turbine showing an annular combustion chamber and a fuel burner and a fuel priming device to prime a main burner manifold.

FIG. 5 shows an enlarged view of the fuel burner in FIG. 4.

Figure 1:
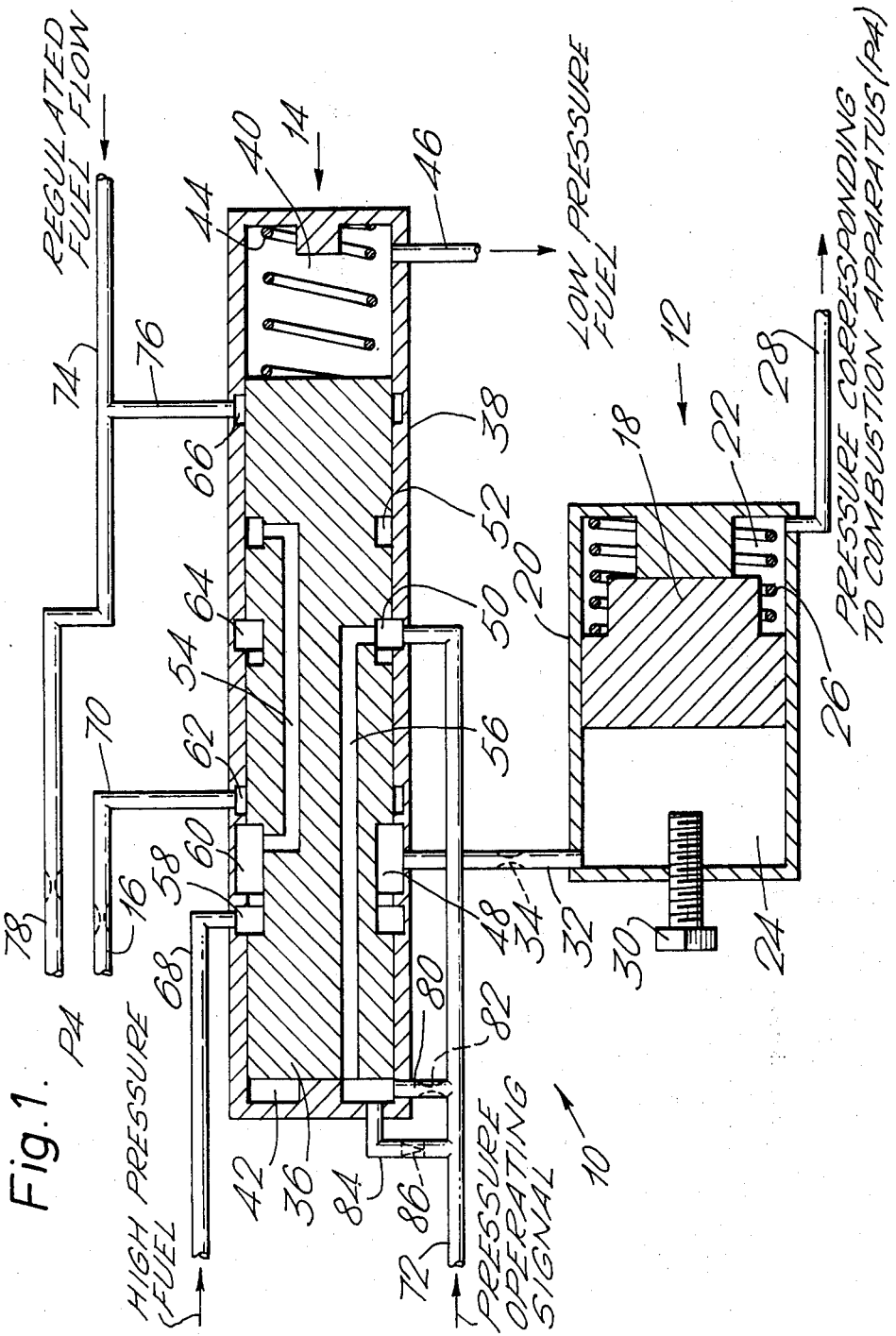
FIG. 1 shows the priming device and control valve in their initial positions.

Referring to FIGS. 4, and 5 a gas turbine engine 90 comprises in flow series a fan 92, a compressor section 94 a combustion system 96, a turbine section 98 and an exhaust nozzle 100. The combustion system 96 in this case comprises an annular combustion chamber 102 and a plurality of fuel burners 104. The fuel burners 104 which are known as duplex burners comprise a pilot burner 110 and a main burner 116, which are supplied with fuel from a pilot burner manifold 78 through a fuel passage 108 in a fuel feed arm 106, and a main burner manifold 16 through a fuel passage 112, and an annular fuel manifold 114 in the fuel feed arm 106 respectively.

The pilot burner manifold 78 is supplied with fuel from a regulated fuel flow supply through a pipe 74.

The pipe 74 also supplies the regulated fuel through pipe 76 to a fuel priming device 10 which provides a metered quantity of fuel to fill the main burner manifold 16 before supplying the regulated fuel to the main burner manifold 16 through a pipe 70.

Figure 2:
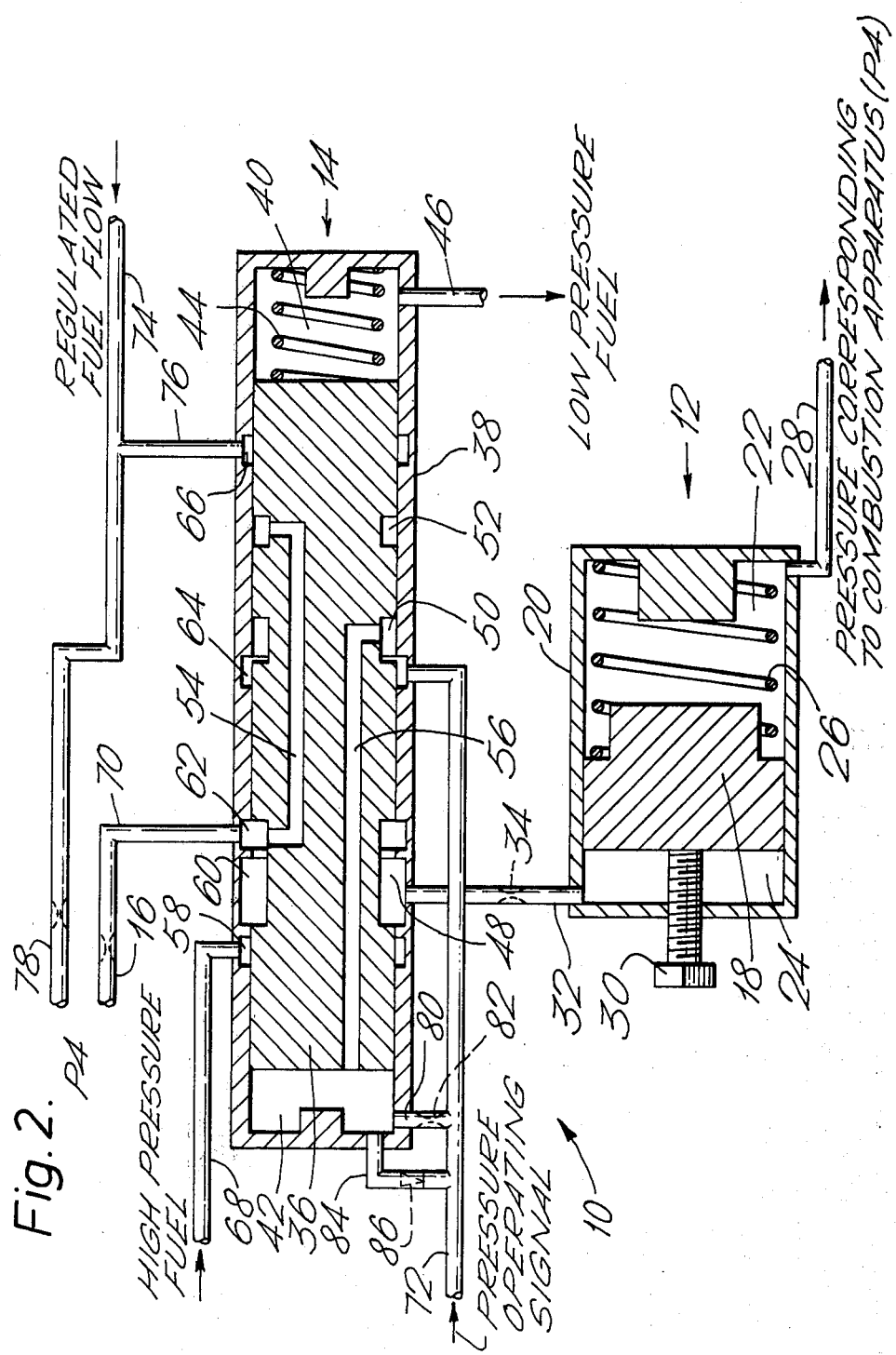
FIG. 2 shows the priming device and control valve in their second positions.
Figure 3:
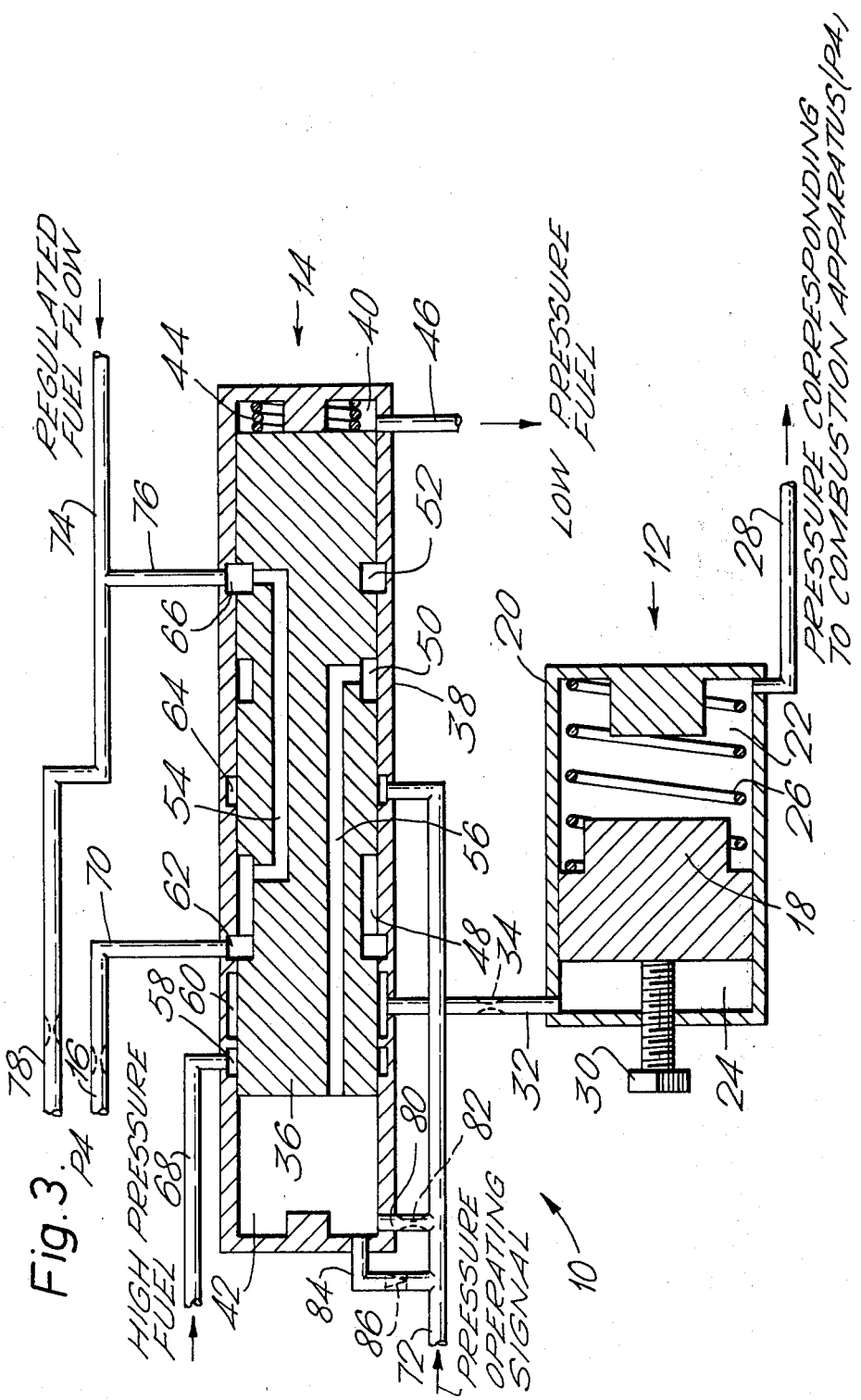
FIG. 3 shows the priming device and control valve in their third positions.

Referring to FIGS. 1 to 3, a fuel priming device 10 comprises a fuel accumulator 12 and a control valve 14. The fuel accumulator 12 being arranged to prime the main burner manifold 16 of a gas turbine engine 90 via the control valve 14 when required.

The fuel accumulator 12 comprises a piston 18 contained within a cylinder 20, and defining with the cylinder two chambers 22 and 24. A spring 26 is located in one chamber 22 which also receives a supply of air at a pressure corresponding to the pressure in the combustion apparatus of the engine through pipe 28. An adjustable volume control 30 controls the travel of the piston 18 into the chamber 24 and a pipe 32 with a variable restrictor 34 connects the chamber 24 of the fuel accumulator 12 with the control valve 14. It will be described later how the fuel accumulator 12 can discharge fuel into the main burner manifold 16 via the control valve 14 and be recharged with fuel via the control valve 14 through pipe 32.

The control valve 14 comprises a piston 36 contained within a cylinder 38 and defining with the cylinder 38 two chambers 40 and 42. A spring 44 is located within chamber 40 which is connected to a source of low pressure fuel by a pipe 46, and chamber 42 is arranged to receive a fuel flow in order to move the piston 36 against the spring load when required.

The piston 36 has three ports 48, 50 and 52, ports 48 and 52 being connected by an internal passage 54 and the port 50 being connected to the chamber 42 by an internal passage 56.

The cylinder 38 has five ports 58, 60, 62, 64 and 66 which are respectively connected to a pipe 68 receiving a high pressure fuel supply, the pipe 32 from the fuel accumulator 12, a pipe 70 from the main burner manifold 16, a pipe 72 which receives the control valve operating signal in the form of a fuel pressure and a pipe 76 which receives a regulated fuel flow supplied from a pipe 74 which also supplies a pilot burner manifold 78.

The control valve operating signal supplied through pipe 72 to the control valve 14 is also taken into the chamber 42 via a pipe 80 having a restrictor 82 and a pipe 84 having a non-return valve 86.

In operation, air enters the gas turbine engine 90 and is given an initial compression by the fan 12 and the air flow is then divided. A first portion of air called bypass air flows around the remainder of the gas turbine engine 90, and a second portion of air, called core air, flows into the compressor section 94 where it is further compressed before being injected into the annular combustion chamber 102 where it is mixed with fuel injected into the combustion chamber 102 from the fuel burner and burnt. The hot gases produced by the combustion of the fuel and air in the annular combustion chamber 102 flow into the turbine section 98 and drive the turbines and associated compressors before passing through the exhaust nozzle 100 to the atmosphere.

The gas turbine engine 90 initially operates at engine idle speeds when the pilot burners 110 alone used to reduce undesirable emissions and the control valve 14 and fuel accumulator 12 are in the positions as shown in FIG. 1, in which regulated fuel is supplied via pipe 74 to the pilot burner manifold 78 and to port 66 of the control valve 14 via pipe 76. Relatively high pressure fuel is supplied to port 58 of the control valve 14 via pipe 68, where it then passes into ports 48 and 60 before being supplied to the fuel accumulator 12 through pipe 32 and variable restrictor 34. The relatively high pressure fuel enters chamber 24 of the fuel accumulator 12 and overcomes spring 26 and pushes piston 18 back to the position as shown in FIG. 1. The chamber 24 of fuel accumulator 12 is then full and ready to prime the main burner manifold 16 when required.

When it is desired to introduce the main burners 116 i.e. when full power is required, a control valve operating signal in the form of fuel pressure signal is supplied via pipes 72 and 80 and restrictor 82 to the control valve 14.

The fuel pressure signal supplied by pipe 72 will cause the pressure to rise in ports 64, and 50 and in internal passage 56 and finally in chamber 42. The rise in pressure in chamber 42 causes rapid movement of the piston 36 against spring 44 to the position as shown in FIG. 2 and isolates port 58 from ports 48 and 60 and terminates the supply of relatively high pressure fuel to the fuel accumulator 12, and at the same time the port 48 connects port 60 with port 62. The fuel in the chamber 24 of the fuel accumulator 12 is then supplied via pipe 32 and variable restrictor 34 to port 60 of the control valve 14 by the motive force of the spring 26 acting on the piston 18 and pushing the piston 18 through chamber 24 and urging fuel into the pipe 32.

The fuel supplied to port 60 of the control valve 14 from fuel accumulator 12 passes into ports 48 and 62, and is then supplied to the main burner manifold 16 through pipe 70.

The adjustable volume control 30 extending through cylinder 20 into the chamber 24 of the fuel accumulator 12 limits the movement of the piston 18 in order to control the volume of fuel supplied to the main burner manifold 16. The adjustable volume control 30 is positioned so that a sufficient volume of fuel is supplied from the chamber 24 of the fuel accumulator 12 to fill the empty main burner manifold 16. The spring 26 is selected to be of low load and rate so that if the main burner manifold 16 is not empty the back pressure produced in the main burner manifold 16 by the restriction in the main burners 116 is sufficient to overcome the motive force of the spring 26 in order to terminate the supply of fuel to the main burner manifold 16. The variable restrictor 34 in the pipe 32 is used to control the time required for priming the main burner manifold 16.

Further movement of the piston 36 isolates port 64 from port 50 and so the pressure in chamber 42 rises slowly due to the restrictor 82 in the pipe 80. The piston 36 moves slowly through chamber 40 until port 60 is isolated from ports 48 and 62, terminating the priming of the main burner manifold 16 by the fuel accumulator 12 and connecting port 66 with port 52. The regulated fuel flow supplied to port 66 from pipe 76 flows through port 52 and internal passage 54 to ports 48 and 62 where the fuel is then supplied via pipe 70 to the main burner manifold 16 and main burners 116 as in FIG. 3. The regulated fuel flow is supplied to the main burner manifold 16 until the pressure signal supplied to the control valve 14 ceases.

When the pressure signal being supplied to the control valve 14 is terminated the pressure in the pipe 72 falls rapidly and the non-return valve 86 in the pipe 84 opens to allow the pressure in the chamber 42 to be released allowing the motive force of the spring 44 to push piston 36 rapidly to the initial position where the operation may commence again.

Although the description referred to a priming device for use with staged burners, it could equally well be used with sector burners. Sector burning is another method of controlling the emissions from the combustion chambers of gas turbine engines operating at engine idle speeds.

This method uses main burners alone, some of the burners are used at all engine operating speeds while those remaining are used only for higher engine operating speeds. Generally the burners used at engine idle speeds are arranged in a group called a sector, usually comprising half the number of burners. The priming device could be used to supply the manifold of the unused burners with fuel when they are to be introduced.

The priming device could also be used to fill any previously empty burner manifold during engine operation, without causing unwelcome discontinuities in the fuel supply to burner manifolds already operating.

I claim:

1. A fuel priming device for gas turbine engine burner manifolds comprising a fuel accumulator, a control valve, a control valve operating means, a regulated fuel supply, a relatively high pressure fuel supply and at least one burner manifold, the fuel accumulator and the regulated fuel supply are arranged to supply fuel sequentially to the burner manifold through the control valve, and the relatively high pressure fuel supply is arranged to supply fuel to the fuel accumulator through the control valve, the control valve being moveable by the control valve operating means from a first position in which the fuel accumulator is connected to the relatively high pressure fuel supply to a second position in which the relatively high pressure fuel supply is disconnected from the fuel accumulator and the fuel accumulator is connected to the burner manifold to provide a metered quantity of fuel to the burner manifold against a pressure in the burner manifold and a third position in which the regulated fuel supply is connected to the burner manifold and the fuel accumulator is disconnected from the burner manifold.

2. A fuel priming device for gas turbine engine burner manifolds as claimed in claim 1 in which the metered quantity of fuel being supplied from the fuel accumulator to the burner manifold against a pressure in the burner manifold is terminated when the pressure in the burner manifold reaches a predetermined level.

3. A fuel priming device for gas turbine engine burner manifolds as claimed in claim 2 in which the fuel accumulator comprises a piston being enclosed in a cylinder and defining with the cylinder a first chamber and a second chamber, the piston being moveable through said first chamber by means of a spring positioned in said second chamber to supply fuel from said first chamber to the burner manifold against a pressure in the burner manifold, the motive force of the spring being overcome by the pressure in the burner manifold and terminates the supply of the metered quantity of fuel when the pressure in the burner manifold reaches a predetermined level.

4. A fuel priming device for gas turbine engine burner manifolds as claimed in claim 3 in which the fuel accumulator has an adjustable volume control extending into the first chamber to limit the movement of the piston, the adjustable volume control may be moved to control the metered quantity of fuel supplied to the burner manifold against a pressure in the burner manifold.

5. A fuel priming device for gas turbine engine burner manifolds as claimed in any of claims 1 to 4 in which the fuel accumulator supplies fuel to the burner manifold through a variable restrictor to permit adjustment of the priming time.

6. A fuel priming device for gas turbine engine burner manifolds as claimed in claim 1 in which the control valve operating means comprises a first and second pipe means to supply a pressure operating signal to the control valve, the second pipe means having a restrictor, the pressure operating signal being supplied via first and second pipe means to move the control valve from the first position to the second position, when the supply via first pipe means is disconnected and the pressure operating signal being supplied via second pipe means to move control valve from the second position to the third position.

7. A fuel priming device for gas turbine engine burner manifolds as claimed in claim 6 in which the control valve operating means also comprises a third pipe means with a non-return valve, the third pipe means releases the pressure in the control valve to the first pipe means when the pressure operating signal ceases and returns control valve to said first position.

8. A fuel priming device for gas turbine engine burner manifolds, as claimed in any of claims 1, 2, 3, 4, 6 or 7 in which the burner manifold is used to supply fuel to the main fuel burners in combustion chambers of gas turbine engines operating staged burning.

* * * * *